United States Patent
Sloane et al.

(10) Patent No.: US 11,755,697 B2
(45) Date of Patent: Sep. 12, 2023

(54) SECURE ACCESS CONTROL FRAMEWORK USING DYNAMIC RESOURCE REPLICATION

(71) Applicant: BANK OF AMERICA CORPORATION, Charlotte, NC (US)

(72) Inventors: Brandon Sloane, Santa Barbara, CA (US); Brian Diederich, Simi Valley, CA (US); Levi Weldon McVay, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 417 days.

(21) Appl. No.: 17/140,934

(22) Filed: Jan. 4, 2021

(65) Prior Publication Data

US 2022/0215078 A1 Jul. 7, 2022

(51) Int. Cl.
*G06F 21/31* (2013.01)
*G06N 20/00* (2019.01)
*G06F 9/50* (2006.01)

(52) U.S. Cl.
CPC ............ *G06F 21/31* (2013.01); *G06F 9/5005* (2013.01); *G06N 20/00* (2019.01); *G06F 2221/2123* (2013.01)

(58) Field of Classification Search
CPC .. G06F 21/31; G06F 2221/2123; G06F 9/468; G06F 9/5005; G06N 20/00
See application file for complete search history.

(56) References Cited

U.S. PATENT DOCUMENTS

| | | |
|---|---|---|
| 5,572,673 A | 11/1996 | Shurts |
| 5,826,268 A | 10/1998 | Schaefer et al. |
| 5,937,159 A | 8/1999 | Meyers et al. |
| 6,236,971 B1 | 5/2001 | Stefik et al. |
| 6,308,273 B1 | 10/2001 | Goertzel et al. |
| 6,530,024 B1 | 3/2003 | Proctor |
| 6,785,728 B1 | 8/2004 | Schneider et al. |
| 6,889,210 B1 | 5/2005 | Vainstein |
| 6,976,023 B2 | 12/2005 | Chen et al. |
| 2001/0019614 A1 | 9/2001 | Madoukh |
| 2002/0010679 A1 | 1/2002 | Felsher |
| 2002/0031230 A1 | 3/2002 | Sweet et al. |
| 2002/0188610 A1 | 12/2002 | Spencer |
| 2003/0120610 A1 | 6/2003 | Hamber |

(Continued)

*Primary Examiner* — Olugbenga O Idowu
(74) *Attorney, Agent, or Firm* — Moore & Van Allen PLLC; Anup Shrinivasan Iyer (57) ABSTRACT

Systems, computer program products, and methods are described herein for secure access control using dynamic resource replication. The present invention is configured to electronically receive, from a computing device of a user, a request to generate a resource access path to access a resource; determine one or more resource requirements associated with the resource; determine an authentication level associated with the user; initiate a resource replication engine on the one or more resource requirements and the authentication level associated with the user; determine, using the resource replication engine, that the one or more requirements and the authentication level associated with the user meets one or more conditions for a replication process; and generate, using the resource replication engine, the resource access path and a plurality of replicate resource access paths.

20 Claims, 5 Drawing Sheets

(56) References Cited

U.S. PATENT DOCUMENTS

| | | |
|---|---|---|
| 2003/0229623 A1 | 12/2003 | Chang et al. |
| 2004/0054933 A1 | 3/2004 | Wong et al. |
| 2005/0015591 A1 | 1/2005 | Thrash et al. |
| 2005/0076044 A1 | 4/2005 | Kagalwala et al. |
| 2005/0193269 A1 | 9/2005 | Haswell et al. |
| 2005/0203881 A1 | 9/2005 | Sakamoto et al. |
| 2006/0059567 A1 | 3/2006 | Bird et al. |
| 2006/0122975 A1 | 6/2006 | Taylor et al. |
| 2015/0350213 A1* | 12/2015 | Varadarajan ............ H04L 63/06 713/189 |
| 2017/0316075 A1* | 11/2017 | Deshmukh .............. H04L 63/08 |

* cited by examiner

SECURE ACCESS CONTROL FRAMEWORK USING DYNAMIC RESOURCE REPLICATION

FIELD OF THE INVENTION

The present invention embraces a system for secure access control using dynamic resource replication.

BACKGROUND

Deception technologies aim to improve an entity's capability to quickly and accurately detect unauthorized access from actors. By using deception techniques, entities generate replicate resource access paths or decoys that mimic legitimate resource access paths throughout the infrastructure. These replicate resource access paths draw unauthorized actors into thinking that they have discovered means to compromise the resource access paths, while in reality, a majority of the resource access paths are decoys. There is a need for a secure access control framework using dynamic resource replication.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for secure access control using dynamic resource replication is presented. The system comprising: at least one non-transitory storage device; and at least one processing device coupled to the at least one non-transitory storage device, wherein the at least one processing device is configured to: electronically receive, from a computing device of a user, a request to generate a resource access path to access a resource; determine one or more resource requirements associated with the resource; determine an authentication level associated with the user; initiate a resource replication engine on the one or more resource requirements and the authentication level associated with the user; determine, using the resource replication engine, that the one or more requirements and the authentication level associated with the user meets one or more conditions for a replication process; and generate, using the resource replication engine, the resource access path and a plurality of replicate resource access paths based on at least determining that the one or more requirements and the authentication level associated with the user meets the one or more conditions for the replication process.

In some embodiments, the at least one processing device is further configured to: electronically receive, from the computing device of the user, an indication to execute one or more actions on the resource access path; retrieve information associated with the one or more actions; determine, using the resource replication engine, that at least a portion of the one or more actions meets the one or more conditions for the replication process; and initiate an execution of the one or more actions on the resource access path, wherein the execution of the one or more actions on the resource access path changes a state of the resource access path; and replicate, using the resource replication engine, the execution of the one or more actions on the plurality of replicate resource access paths, wherein the execution of the one or more actions on the plurality of replicate resource access paths changes a state of the plurality of replicate resource access paths.

In some embodiments, the at least one processing device is further configured to: continuously monitor the state of the resource access path and the state of the plurality of replicate resource access paths; determine that the state of at least one of the plurality of replicate resource access paths has changed from an primary state to a secondary state while the state of the resource access path has not changed; determine that the change in the state of the at least one of the plurality of replicate resource access paths is a result of unauthorized access; and transmit a notification to the computing device of the user indicating that the change in the state of the at least one of the plurality of replicate resource access paths is the result of unauthorized access.

In some embodiments, the at least one processing device is further configured to: generate, using the resource replication engine, the resource access path and a plurality of replicate resource access paths, wherein generating further comprises: determining one or more configuration parameters associated with the resource access path, wherein the one or more configuration parameters is associated with access control enforcement for the resource; initiating one or more machine learning algorithms on the one or more configuration parameters; determining, using the one or more machine learning algorithms, one or more distribution parameters associated with the one or more configuration parameters; skewing the one or more distribution parameters using a predetermined shift parameter to generate one or more skewed distribution parameters; and generating, using the one or more machine learning algorithms, the plurality of replicate resource access paths using the one or more skewed distribution parameters.

In some embodiments, the at least one processing device is further configured to: determine the one or more resource requirements associated with the resource, wherein the one or more resource requirements comprises information associated with the resource, wherein the information associated with the resource comprises a likelihood of exposure, an authentication requirement, and/or one or more resource dependencies.

In some embodiments, the at least one processing device is further configured to: electronically receive, from the computing device of the user, the request to generate the resource access path; initiate, via the computing device of the user, an authentication request to the user; electronically receive, from the computing device of the user, one or more authentication credentials; and determine the authentication level associated with the user based on at least the one or more authentication credentials.

In some embodiments, the at least one processing device is further configured to: validate the one or more authentication credentials to verify an identity of the user.

In another aspect, a computer program product for secure access control using dynamic resource replication is presented. The computer program product comprising a non-transitory computer-readable medium comprising code causing a first apparatus to: electronically receive, from a computing device of a user, a request to generate a resource access path to access a resource; determine one or more resource requirements associated with the resource; determine an authentication level associated with the user; initiate a resource replication engine on the one or more resource requirements and the authentication level associated with the user; determine, using the resource replication engine, that the one or more requirements and the authentication level associated with the user meets one or more conditions for a replication process; and generate, using the resource replication engine, the resource access path and a plurality of replicate resource access paths based on at least determining that the one or more requirements and the authentication level associated with the user meets the one or more conditions for the replication process.

In yet another aspect, a method for secure access control using dynamic resource replication is presented. The method comprising: electronically receiving, from a computing device of a user, a request to generate a resource access path to access a resource; determining one or more resource requirements associated with the resource; determining an authentication level associated with the user; initiating a resource replication engine on the one or more resource requirements and the authentication level associated with the user; determining, using the resource replication engine, that the one or more requirements and the authentication level associated with the user meets one or more conditions for a replication process; and generating, using the resource replication engine, the resource access path and a plurality of replicate resource access paths based on at least determining that the one or more requirements and the authentication level associated with the user meets the one or more conditions for the replication process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution that owns and/or operates an online system of networked computing devices, systems, and/or peripheral devices on which the system described herein is implemented. The entity may employ information technology resources and particularly technology infrastructure to accomplish its organizational objectives. These objectives may be related to the people who work for the organization, its products or services, the customers or any other aspect of the operations of the organization. As such, the entity may be any institution, group, association, financial institution, establishment, company, union, authority or the like, employing information technology resources within its enterprise environment to accomplish its organizational objectives.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine an authorization level of the user, i.e., determine whether the user has authority to access an account or system, and define the type of actions that the user is authorized to perform with the access. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may refer to electronic components associated with the technology infrastructure (e.g., system environment described herein) of the entity. These electronic components include software components such as applications, databases, data files, and/or the like, hardware components such as computing devices, network devices, and/or the like, network components such as server, client, peer, transmission medium, connecting devices, and/or the like, and any other electronic component associated with the technology infrastructure.

As used herein, a "resource access path" may generally refer to a communication link providing a user with the ability and opportunity to access and use any resource. In example implementations, a resource access path may be an account that allows the user to read, write, and modify the configuration of the resource. In some embodiments, the resource access path may be associated with various authentication levels, where a user must meet authorization requirements specific to the authentication level to access and/or user the resource. The authentication level associated with the resource defines the type of actions that can be performed on the resource. For example, a resource access path may require a user to have an administrator level of authorization to modify the resource and accommodate varying systems and authentication mechanisms.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Figure 1:
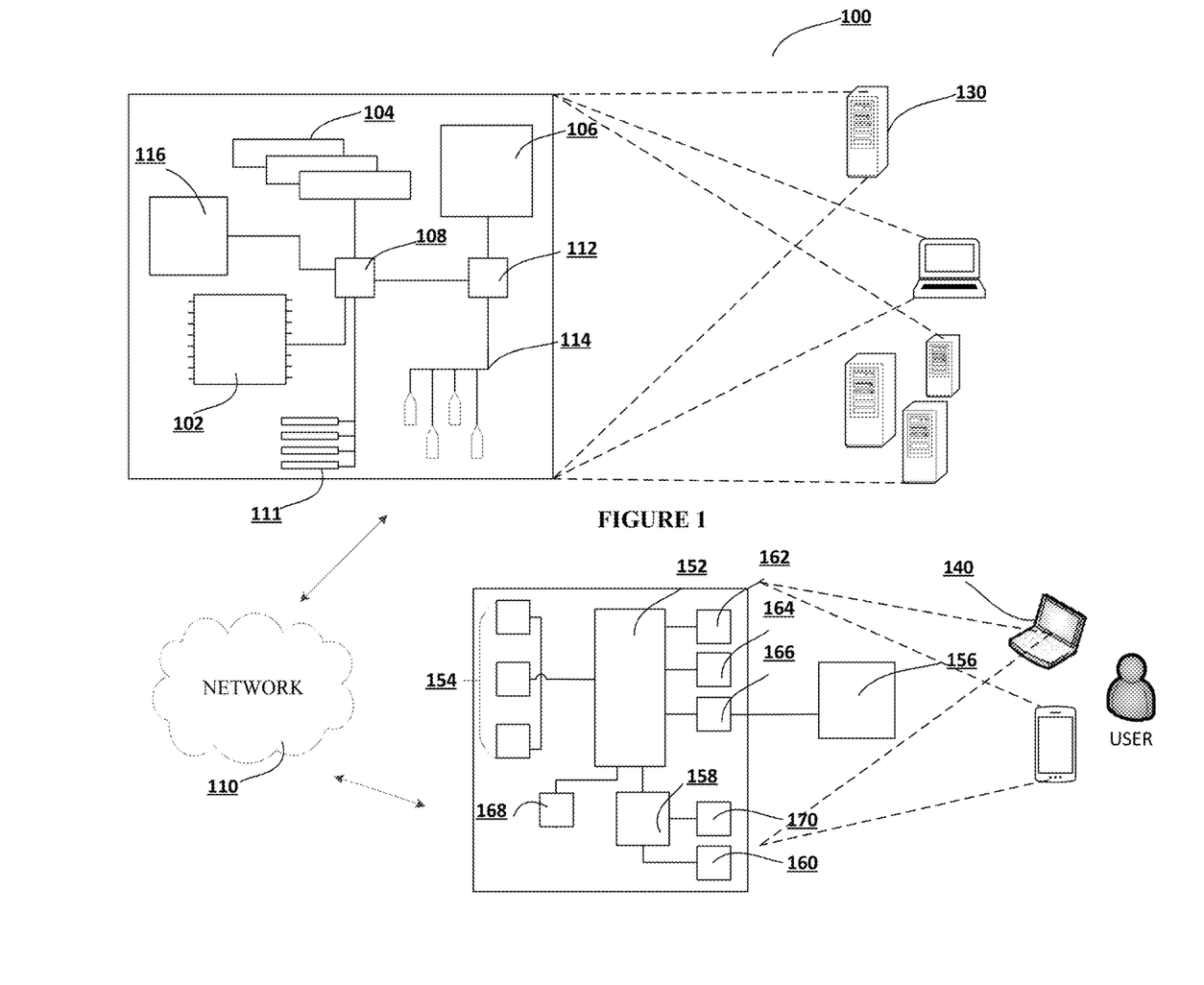
FIG. 1 presents an exemplary block diagram of the system environment for secure access control using dynamic resource replication, in accordance with an embodiment of the invention.

FIG. 1 presents an exemplary block diagram of the system environment for secure access control using dynamic resource replication 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 140 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Figure 2:
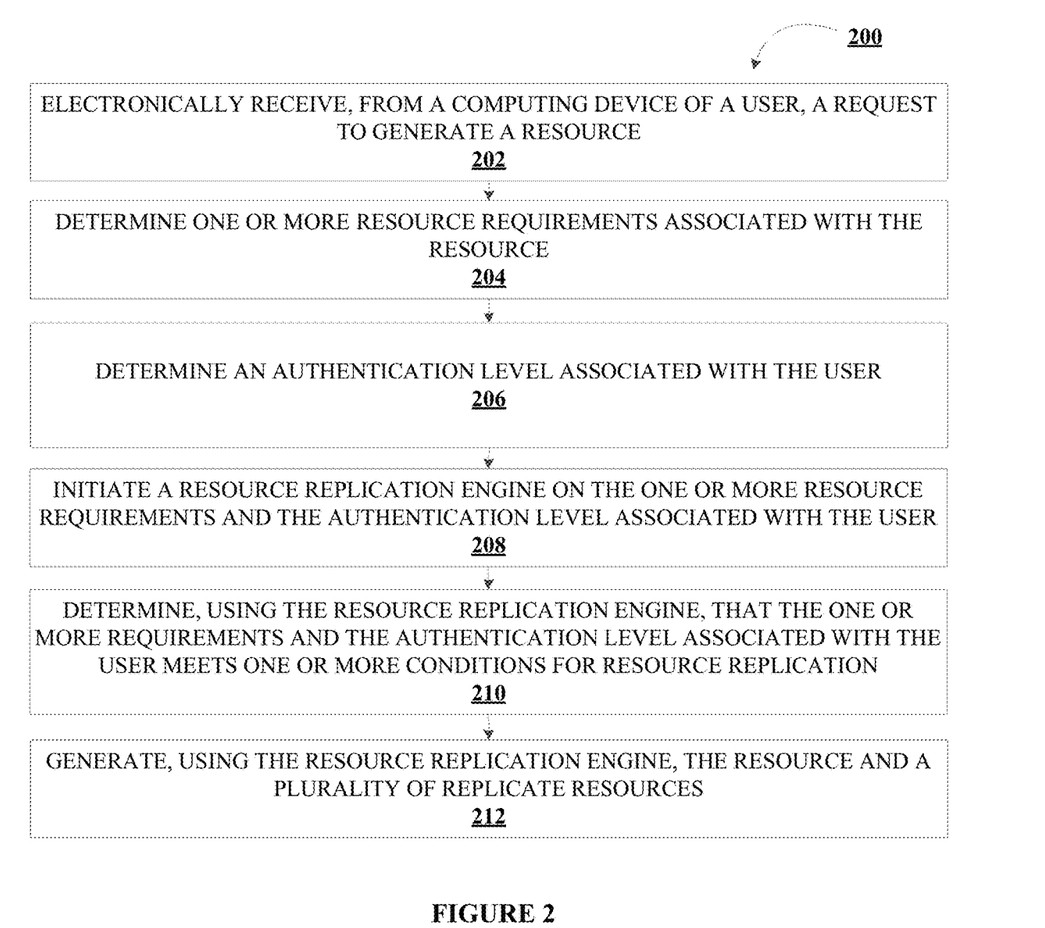
FIG. 2 illustrates a process flow for dynamic generation of replicate resources, in accordance with an embodiment of the invention.

FIG. 2 illustrates a process flow for dynamic generation of replicate resources 200, in accordance with an embodiment of the invention. As shown in block 202, the process flow includes electronically receiving, from a computing device of a user, a request to generate a resource access path to access a resource. As described herein, a resource access path may refer to a communication link that provides a user with the ability and opportunity to access and use any resource. In some embodiments, a resource access path allows a user to authenticate to a system and potentially to receive authorization to access resources provided by or connected to that system. In one aspect, a user is typically required to authenticate oneself with a password or other authentication credentials for the purposes of accounting, security, logging, and resource management.

Next, as shown in block 204, the process flow includes determining one or more resource requirements associated with the resource. As used here, "resource requirement" may refer to any function, attribute, capability, characteristic, or quality of a resource for it to have value and utility to the user and/or the entity. Accordingly, a resource requirement may define a physical, computational, and/or functional need associated with a resource for access and use. In other words, resource requirements may include specific elements and/or functions that are necessary for access and use of a resource. In some embodiments, resource requirements associated with a resource may include information associated with the resource, including a likelihood of exposure, an authentication requirement, resource dependencies, and/or the like.

Next, as shown in block 206, the process flow includes determining an authentication level associated with the user. The authentication level of the user may dictate the user's permissions to access and use the resource. In some embodiments, the system may be configured to determine the authentication level of the user based on at least the authentication credentials of the user. In this regard, the system may be configured to initiate, via the computing device of the user, an authentication request to the user. In response, the system may be configured to electronically receive, from the computing device of the user, one or more authentication credentials. Based on the authentication credentials provided by the user, the system may determine the authentication level of the user.

Next, as shown in block 208, the process flow includes initiating a resource replication engine on the one or more resource requirements and the authentication level associated with the user. In some embodiments, the resource replication engine may be used to determine whether the resource qualifies for replication process. In one aspect, the replication process may include replicating the resource access path associated with the resource. By replicating the resource access path to resemble the legitimate resource access path, the system provides a safeguard to mitigate any unauthorized users from compromising the legitimate resource access path and access the resource without requisite authorization. Accordingly, the resource replication engine generates decoy resource access paths that mimic legitimate resources. These replicate resource access paths (decoys) can run in a virtual or real operating system environment and are configured to trick the unauthorized user into thinking that they have identified a means to access the resource without requisite authorization, modify privileges, misappropriate associated data, and/or the like.

Next, as shown in block 210, the process flow includes determining, using the resource replication engine, that the one or more requirements and the authentication level associated with the user meets one or more conditions for the replication process. In some embodiments, each resource may be pre-configured with one or more conditions, that when met, indicate that the resource qualifies for the replication process. When the resource requirements associated with the resource being requested meets the conditions, the system may be configured to automatically trigger the resource replication engine to initiate the replication process.

Next, as shown in block 212, the process flow includes generating, using the resource replication engine, the resource access path and a plurality of replicate resource access paths. In some embodiments, the resource replication engine may be configured to determine one or more configuration parameters associated with the resource access path. In one aspect, the configuration parameters may be associated with access control enforcement for the resource and can be used to implement selective restriction of access to the resource. In some embodiments, the configuration parameters may include user identification information such as a username, email address, unique user identifier, and/or the like. In some other embodiments, the configuration parameters may include authentication and authorization information. In this regard, the configuration parameters may include the authentication level of the user and an authorization requirement associated with the resource. In one aspect, the authorization requirement may include information associated with specific features of the resource that may be accessible to the user at specific authentication levels. In still other embodiments, the configuration parameters may include information associated with computing resources required by the technology infrastructure to manage, host, and facilitate access to and use of the resource via the resource access path.

Once the configuration parameters are determined, the resource replication engine may be configured to use machine learning algorithms to learn the structure of the resource access path using the configuration parameters. Accordingly, the resource replication engine may be configured to initiate one or more machine learning algorithms on the one or more configuration parameters. By initiating the machine learning algorithms on the configuration parameters, the resource replication engine may be configured to learn the structure of the (legitimate) resource access path that is to be generated. In this regard, the resource replication engine may be configured to determine the one or more distribution parameters that are fundamental to the structure of the resource access path.

Once the structure of the resource access path is determined, the resource replication engine may be configured to generate replicate resource access paths by skewing the structure of the (legitimate) resource access path. Accordingly, in response to determining the distribution parameters, the resource replication engine may be configured to skew the one or more distribution parameters using a predetermined shift parameter to generate one or more skewed distribution parameters. In some embodiments, the shift parameter may be introduced to the distribution parameters to ensure that any replicate resource access path generated using the skewed distribution parameters have similar configuration parameters to that of the legitimate resource access path to mimic legitimacy. In some embodiments, skewness may be a measure of how much the replicate resource access paths deviate from the legitimate resource access path. By introducing skewness to the distribution parameters of the configuration parameters, the resource replication engine may be configured to ensure that any replicate resource access path generated using the skewed distribution parameters are similar enough to mimic legitimacy.

In response to skewing the distribution parameters, the resource replication engine may be configured to generate, using the one or more machine learning algorithms, the plurality of replicate resource access paths using the one or more skewed distribution parameters. In response to generating the replicate resource access paths, the resource replication engine may be configured to generate a unique identifier (UID) for the legitimate resource access path and each replicate resource access path. In one aspect, the UID may be a name—string, numeric, or alphanumeric character—that identifies (that is, labels the identity of) the object and the class of the object. Accordingly, the UID identifies each resource access path (legitimate and replicate) and also identifies whether a specific resource access path is legitimate or replicate. In some embodiments, the class of the object, i.e., whether the resource access path is a legitimate one or a replicate, once generated, is known only to the resource replication engine and is treated as sensitive information and protected from unwarranted disclosure.

Figure 3:
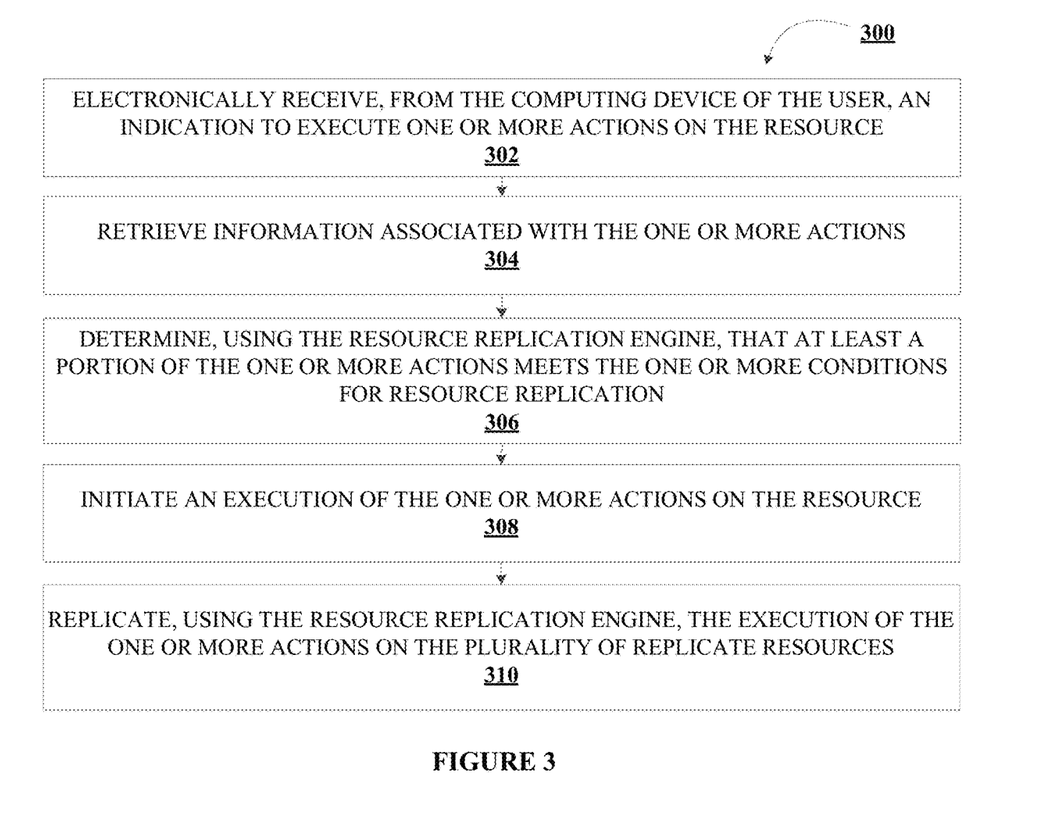
FIG. 3 illustrates a process flow for replicating executable actions using the resource replication engine, in accordance with an embodiment of the invention.

FIG. 3 illustrates a process flow for replicating executable actions using the resource replication engine 300, in accordance with an embodiment of the invention. As shown in block 302, the process flow includes electronically receiving, from the computing device of the user, an indication to execute one or more actions on the resource access path. In some embodiments, the one or more actions may include changes to the configuration parameters associated with the resource access path.

Next, as shown in block 304, the process flow includes retrieving information associated with the one or more actions. In one example, the user may execute an action to change the access privilege associated with the resource access path. In another example, the user may execute an action to access specific features of the resource using the resource access path. In yet another aspect, the user may execute an action to modify allocation of computing resources to facilitate access to the resource using the resource access path.

Next, as shown in block 306, the process flow includes determining, using the resource replication engine, that at least a portion of the one or more actions meets the one or more conditions for the replication process. In some embodiments, each action may be pre-configured with one or more conditions, that when met, indicate that the action qualifies for the replication process. When at least a portion of the one or more actions meets the one or more conditions, the system may be configured to automatically trigger the resource replication engine to initiate the replication process.

Next, as shown in block 308, the process flow includes initiating an execution of the one or more actions on the resource access path. Next, as shown in block 310, the process flow includes replicating, using the resource replication engine, the execution of the one or more actions on the plurality of replicate resource access paths.

Figure 4:
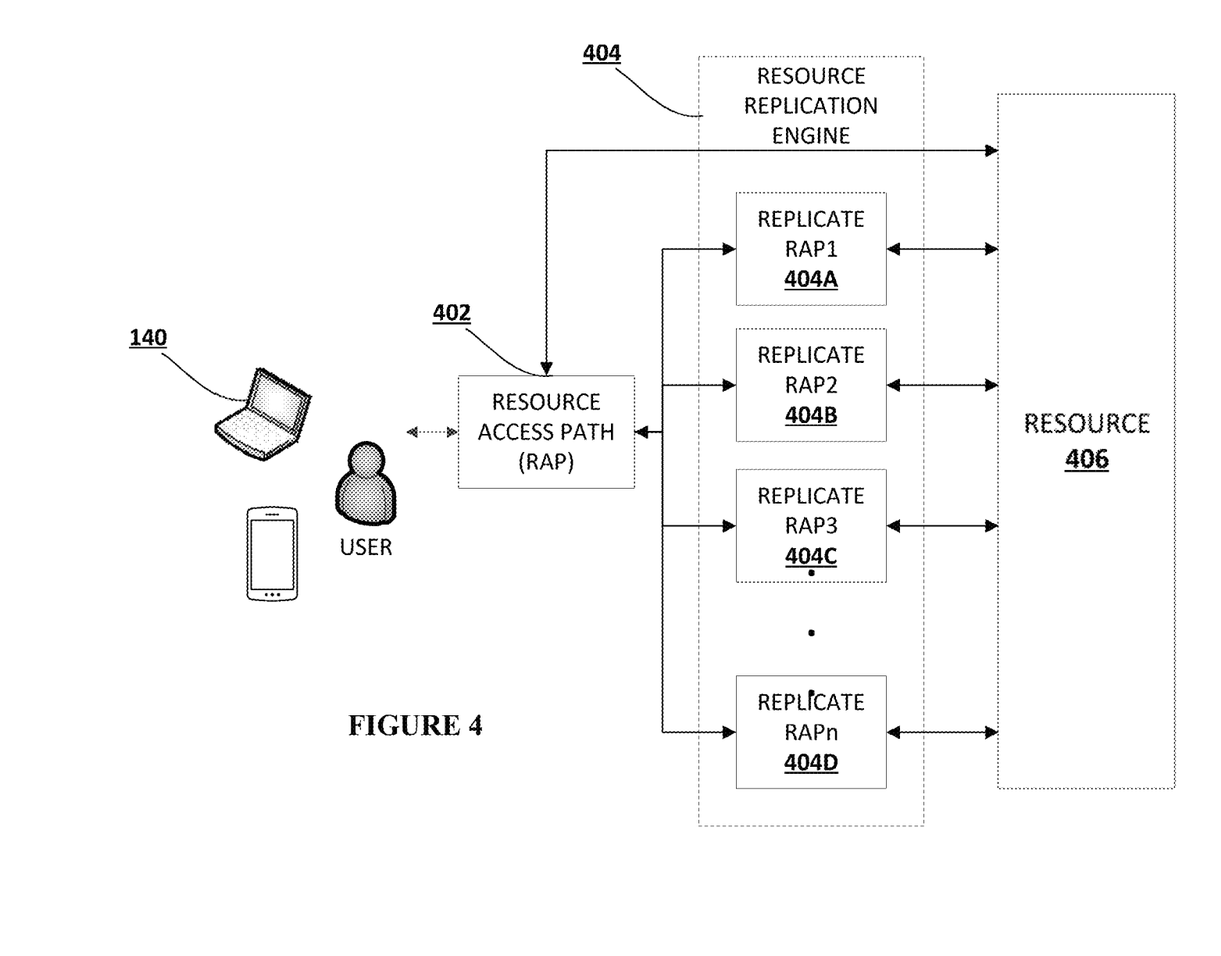
FIG. 4 illustrates a data flow diagram for secure access control using dynamic resource replication, in accordance with an embodiment of the invention.

FIG. 4 illustrates a data flow diagram for secure access control using dynamic resource replication 400, in accordance with an embodiment of the invention. As shown in FIG. 4, the user may initiate a request to generate a resource access path (RAP) 402 to access a resource 406 using the user input system 140. In response, the system may be configured to determine the resource requirements associated with the resource 406 and the authentication level of the user. In response, the system may be configured to determine, using the resource replication engine 404, whether the one or more requirements and the authentication level associated with the user meets one or more conditions for the replication process. When the resource requirements associated with the resource being requested meets the conditions, the system may be configured to automatically trigger the resource replication engine to initiate the replication process. As described herein, the replication process involves generating replicate resource access paths 404A-D by skewing distribution parameters of the configuration parameters of the legitimate resource access path 402.

Once the resource access path 402 (and the replicate resource access paths 404A-D) is generated, the user may interact with the resource 406 via the resource access path 402. In regular course of operation, the resource 406 may be accessed by multiple users via multiple resource access paths (not shown). When such a user initiates such an interaction as the one shown in FIG. 4, the user initiating the interaction may only have knowledge of the interaction as executed using the resource access path 402. The interaction activity on the system side may indicate that the resource 406 is being accessed by the resource access path 402 and replicate resource access paths 404A-D without actually having the knowledge that 404A-D are indeed replicate resource access paths and the resource access path 402 is the only legitimate resource access path. To the system, the replicate resource access paths 404A-D represent themselves as legitimate resource access paths. The resource replication engine 404 assigns a UID to each resource access path, 402 and 404A-D and also identifies whether the specific resource access path is legitimate, i.e., 402 or replicate, i.e., 404A-D. When a malicious actor identifies the resource access paths that are accessing the resource 404, the malicious actor may only be able to discern that there are a number of resource access paths accessing the resource, without actually having the knowledge that only one of the resource access paths, specifically resource access path 402, is legitimate while the other resource access paths, specifically resource access paths 404A-D, are replicates. The only component that is capable of distinguishing the legitimate resource access path 402 from the replicate resource access paths 404A-D is the resource replication engine, which assigns and protects the UID for each resource access path.

Figure 5:
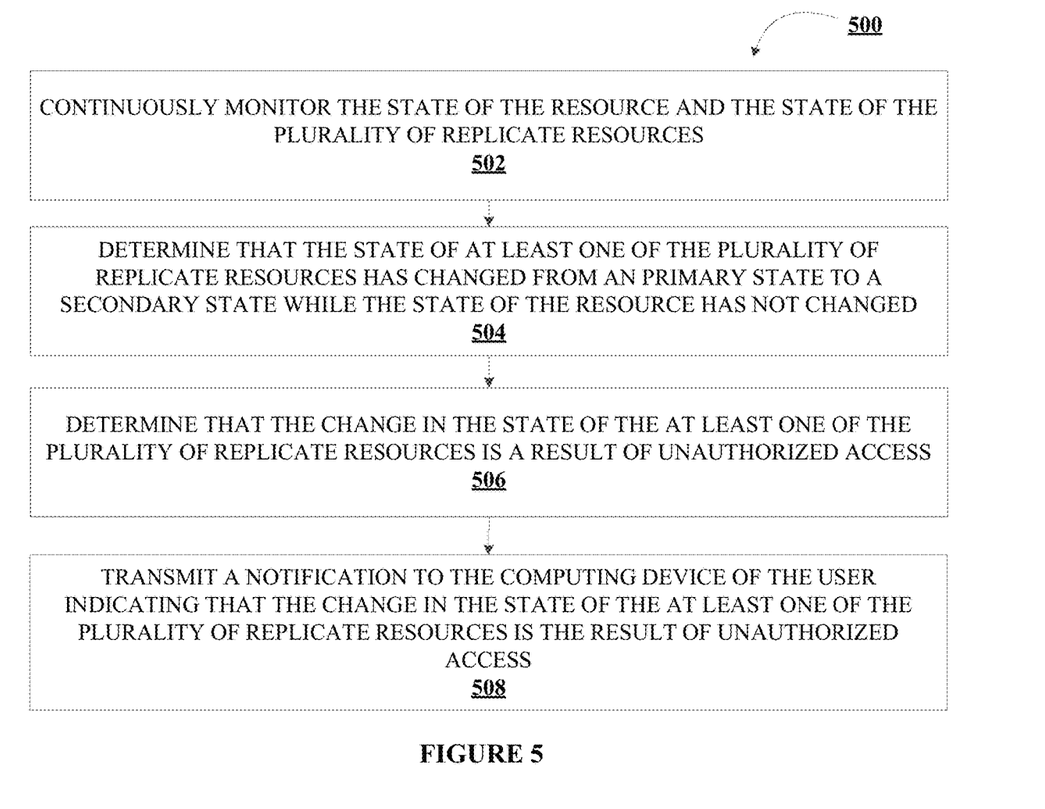
FIG. 5 illustrates a process flow for secure access control using dynamic resource replication, in accordance with an embodiment of the invention.

FIG. 5 illustrates a process flow for secure access control using dynamic resource replication 500, in accordance with an embodiment of the invention. As shown in block 502, the process flow includes continuously monitoring the state of the resource access path and the state of the plurality of replicate resource access paths. The state of the resource access path may refer to a configuration or condition of the resource access path at a specific time that is fully identified by values of a suitable set of parameters, such as the configuration parameters. Similarly, the state of the replicate resource access paths may refer to a configuration or condition of the resource at the same specific time identifiable by values of a suitable set of corresponding parameters.

Next, as shown in block 504, the process flow includes determining that the state of at least one of the plurality of replicate resource access paths has changed from an primary state to a secondary state while the state of the resource access path has not changed. Typically, any action executed by the user on the resource access path changes the state of the resource access path from one state to another. When this interaction meets the conditions for replication and is indeed replicated, the state of the plurality of replicate resource access paths also change from one state to another. If the interaction does not meet the conditions for replication and is not replicated, the state of the resource access path changes, but the state of plurality of replicate resource access paths do not change.

Next, as shown in block 506, the process flow includes determining that the change in the state of the at least one of the plurality of replicate resource access paths is a result of unauthorized access. As described herein, the only the only time the state of the plurality of replicate resource access paths change is when the state of the resource access path changes. Therefore, when the system determines that the state of at least one of the plurality of replicate resource access paths has changed, while the state of the resource access path has not changed, the system may be configured to determine that such a change in state is a result of unauthorized access.

Next, as shown in block 508, the process flow includes transmitting a notification to the computing device of the user indicating that the change in the state of the at least one of the plurality of replicate resource access paths is the result of unauthorized access. In addition to transmitting the notification to the user, the system may be configured to initiate one or more mitigation actions to reverse the state of the at least one of the plurality of replicate resource access paths and block any subsequent unauthorized accesses.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for secure access control using dynamic resource replication, the system comprising:
   at least one non-transitory storage device; and
   at least one processing device coupled to the at least one non-transitory storage device, wherein the at least one processing device is configured to:
   electronically receive, from a computing device of a user, a request to generate a resource access path to access a resource;
   determine one or more resource requirements associated with the resource;
   determine an authentication level associated with the user;
   initiate a resource replication engine to generate the resource access path based on the one or more resource requirements and the authentication level associated with the user;
   determine, using the resource replication engine, that the one or more requirements and the authentication level associated with the user meets one or more conditions for a replication process;
   generate, using the resource replication engine, the resource access path and a plurality of replicate resource access paths based on at least determining that the one or more requirements and the authentication level associated with the user meets the one or more conditions for the replication process;

execute one or more actions on the resource access path, wherein the execution of the one or more actions on the resource access path changes a state of the resource access path; and replicate, using the resource replication engine, the execution of the one or more actions on the plurality of replicate resource access paths, wherein the execution of the one or more actions on the plurality of replicate resource access paths changes a state of the plurality of replicate resource access paths.

2. The system of claim 1, wherein the at least one processing device is further configured to:

electronically receive, from the computing device of the user, an indication to execute one or more actions on the resource access path;

retrieve information associated with the one or more actions; and determine, using the resource replication engine, that at least a portion of the one or more actions meets the one or more conditions for the replication process.

3. The system of claim 2, wherein the at least one processing device is further configured to:

continuously monitor the state of the resource access path and the state of the plurality of replicate resource access paths;

determine that the state of at least one of the plurality of replicate resource access paths has changed from a primary state to a secondary state while the state of the resource access path has not changed;

determine that the change in the state of the at least one of the plurality of replicate resource access paths is a result of unauthorized access; and transmit a notification to the computing device of the user indicating that the change in the state of the at least one of the plurality of replicate resource access paths is the result of unauthorized access.

4. The system of claim 1, wherein the at least one processing device is further configured to:

generate, using the resource replication engine, the resource access path and a plurality of replicate resource access paths, wherein generating further comprises:

determining one or more configuration parameters associated with the resource access path, wherein the one or more configuration parameters is associated with access control enforcement for the resource;

initiating one or more machine learning algorithms on the one or more configuration parameters;

determining, using the one or more machine learning algorithms, one or more distribution parameters associated with the one or more configuration parameters;

skewing the one or more distribution parameters using a predetermined shift parameter to generate one or more skewed distribution parameters; and generating, using the one or more machine learning algorithms, the plurality of replicate resource access paths using the one or more skewed distribution parameters.

5. The system of claim 1, wherein the at least one processing device is further configured to:

determine the one or more resource requirements associated with the resource, wherein the one or more resource requirements comprises information associated with the resource, wherein the information associated with the resource comprises a likelihood of exposure, an authentication requirement, and/or one or more resource dependencies.

6. The system of claim 1, wherein the at least one processing device is further configured to:

electronically receive, from the computing device of the user, the request to generate the resource access path;

initiate, via the computing device of the user, an authentication request to the user;

electronically receive, from the computing device of the user, one or more authentication credentials; and determine the authentication level associated with the user based on at least the one or more authentication credentials.

7. The system of claim 6, wherein the at least one processing device is further configured to:

validate the one or more authentication credentials to verify an identity of the user.

8. A computer program product for secure access control using dynamic resource replication, the computer program product comprising a non-transitory computer-readable medium comprising code causing a first apparatus to:

electronically receive, from a computing device of a user, a request to generate a resource access path to access a resource;

determine one or more resource requirements associated with the resource;

determine an authentication level associated with the user;

initiate a resource replication engine to generate the resource access path based on the one or more resource requirements and the authentication level associated with the user;

determine, using the resource replication engine, that the one or more requirements and the authentication level associated with the user meets one or more conditions for a replication process;

generate, using the resource replication engine, the resource access path and a plurality of replicate resource access paths based on at least determining that the one or more requirements and the authentication level associated with the user meets the one or more conditions for the replication process;

execute one or more actions on the resource access path, wherein the execution of the one or more actions on the resource access path changes a state of the resource access path; and replicate, using the resource replication engine, the execution of the one or more actions on the plurality of replicate resource access paths, wherein the execution of the one or more actions on the plurality of replicate resource access paths changes a state of the plurality of replicate resource access paths.

9. The computer program product of claim 8, wherein the code causes the first apparatus to:

electronically receive, from the computing device of the user, an indication to execute one or more actions on the resource access path;

retrieve information associated with the one or more actions; and determine, using the resource replication engine, that at least a portion of the one or more actions meets the one or more conditions for the replication process.

10. The computer program product of claim 9, wherein the code causes the first apparatus to:

continuously monitor the state of the resource access path and the state of the plurality of replicate resource access paths;

determine that the state of at least one of the plurality of replicate resource access paths has changed from a primary state to a secondary state while the state of the resource access path has not changed;

determine that the change in the state of the at least one of the plurality of replicate resource access paths is a result of unauthorized access; and transmit a notification to the computing device of the user indicating that the change in the state of the at least one of the plurality of replicate resource access paths is the result of unauthorized access.

11. The computer program product of claim 8, wherein the code causes the first apparatus to:

generate, using the resource replication engine, the resource access path and a plurality of replicate resource access paths, wherein generating further comprises:

determining one or more configuration parameters associated with the resource access path, wherein the one or more configuration parameters is associated with access control enforcement for the resource;

initiating one or more machine learning algorithms on the one or more configuration parameters;

determining, using the one or more machine learning algorithms, one or more distribution parameters associated with the one or more configuration parameters;

skewing the one or more distribution parameters using a predetermined shift parameter to generate one or more skewed distribution parameters; and generating, using the one or more machine learning algorithms, the plurality of replicate resource access paths using the one or more skewed distribution parameters.

12. The computer program product of claim 8, wherein the code causes the first apparatus to:

determine the one or more resource requirements associated with the resource, wherein the one or more resource requirements comprises information associated with the resource, wherein the information associated with the resource comprises a likelihood of exposure, an authentication requirement, and/or one or more resource dependencies.

13. The computer program product of claim 8, wherein the code causes the first apparatus to:

electronically receive, from the computing device of the user, the request to generate the resource access path;

initiate, via the computing device of the user, an authentication request to the user;

electronically receive, from the computing device of the user, one or more authentication credentials; and determine the authentication level associated with the user based on at least the one or more authentication credentials.

14. The computer program product of claim 13, wherein the code causes the first apparatus to:

validate the one or more authentication credentials to verify an identity of the user.

15. A method for secure access control using dynamic resource replication, the method comprising:

electronically receiving, from a computing device of a user, a request to generate a resource access path to access a resource;

determining one or more resource requirements associated with the resource;

determining an authentication level associated with the user;

initiating a resource replication engine to generate the resource access path based on the one or more resource requirements and the authentication level associated with the user;

determining, using the resource replication engine, that the one or more requirements and the authentication level associated with the user meets one or more conditions for a replication process;

generating, using the resource replication engine, the resource access path and a plurality of replicate resource access paths based on at least determining that the one or more requirements and the authentication level associated with the user meets the one or more conditions for the replication process;

executing one or more actions on the resource access path, wherein the execution of the one or more actions on the resource access path changes a state of the resource access path; and replicating, using the resource replication engine, the execution of the one or more actions on the plurality of replicate resource access paths, wherein the execution of the one or more actions on the plurality of replicate resource access paths changes a state of the plurality of replicate resource access paths.

16. The method of claim 15, wherein the method further comprises:

electronically receiving, from the computing device of the user, an indication to execute one or more actions on the resource access path;

retrieving information associated with the one or more actions; and determining, using the resource replication engine, that at least a portion of the one or more actions meets the one or more conditions for the replication process.

17. The method of claim 16, wherein the method further comprises:

continuously monitoring the state of the resource access path and the state of the plurality of replicate resource access paths;

determining that the state of at least one of the plurality of replicate resource access paths has changed from a primary state to a secondary state while the state of the resource access path has not changed;

determining that the change in the state of the at least one of the plurality of replicate resource access paths is a result of unauthorized access; and transmitting a notification to the computing device of the user indicating that the change in the state of the at least one of the plurality of replicate resource access paths is the result of unauthorized access.

18. The method of claim 15, wherein the method further comprises:

generating, using the resource replication engine, the resource access path and a plurality of replicate resource access paths, wherein generating further comprises:

determining one or more configuration parameters associated with the resource access path, wherein the one or more configuration parameters is associated with access control enforcement for the resource;

initiating one or more machine learning algorithms on the one or more configuration parameters;

determining, using the one or more machine learning algorithms, one or more distribution parameters associated with the one or more configuration parameters;

skewing the one or more distribution parameters using a predetermined shift parameter to generate one or more skewed distribution parameters; and generating, using the one or more machine learning algorithms, the plurality of replicate resource access paths using the one or more skewed distribution parameters.

19. The method of claim 15, wherein the method further comprises:

determining the one or more resource requirements associated with the resource, wherein the one or more resource requirements comprises information associated with the resource, wherein the information associated with the resource comprises a likelihood of exposure, an authentication requirement, and/or one or more resource dependencies.

20. The method of claim 15, wherein the method further comprises:

electronically receiving, from the computing device of the user, the request to generate the resource access path;

initiating, via the computing device of the user, an authentication request to the user;

electronically receiving, from the computing device of the user, one or more authentication credentials; and determining the authentication level associated with the user based on at least the one or more authentication credentials.

* * * * *